US012678900B2

(12) United States Patent
Iwazaki et al.

(10) Patent No.: US 12,678,900 B2
(45) Date of Patent: Jul. 14, 2026

(54) VEHICLE MANUFACTURING SYSTEM, VEHICLE MANUFACTURING METHOD, AND NON-TRANSITORY COMPUTER READABLE MEDIUM

(71) Applicant: TOYOTA JIDOSHA KABUSHIKI KAISHA, Toyota (JP)

(72) Inventors: Noritsugu Iwazaki, Shizuoka-ken (JP); Takeshi Kanou, Seto (JP); Go Inoue, Gotenba (JP); Yuki Okamoto, Ebina (JP); Kento Ohara, Nisshin (JP); Satoshi Takahashi, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/034,800

(22) Filed: Jan. 23, 2025

(65) Prior Publication Data

US 2025/0262697 A1 Aug. 21, 2025

(30) Foreign Application Priority Data

Feb. 21, 2024 (JP) ................................. 2024-024429

(51) Int. Cl.
B23P 21/00 (2006.01)
B62D 65/02 (2006.01)
G05B 19/418 (2006.01)

(52) U.S. Cl.
CPC .......... B23P 21/004 (2013.01); B62D 65/022 (2013.01); G05B 19/41815 (2013.01);
(Continued)

(58) Field of Classification Search
CPC .......... B62D 65/00–005; B62D 65/022; B23P 21/004; G05B 19/41815; G05B 19/4183; G05B 19/4189; G05B 19/41865
See application file for complete search history.

(56) References Cited

U.S. PATENT DOCUMENTS

2017/0320529 A1 11/2017 Nordbruch
2018/0339703 A1 11/2018 Nix
(Continued)

FOREIGN PATENT DOCUMENTS

EP 4468020 A1 11/2024
JP 2017-538619 A 12/2017
JP 7388589 B1 11/2023

OTHER PUBLICATIONS

Massimo Onofri et al., "A Graph-Based Control Scheme of Mobile Ad-hoc Networks for Safety & Rescue Missions", Proceedings of the 33rd Chinese Control Conference, Jul. 28-30, 2014, pp. 1270-1275.

*Primary Examiner* — Matthew P Travers
(74) *Attorney, Agent, or Firm* — Sughrue Mion, PLLC

(57) ABSTRACT

A vehicle manufacturing system includes: a first information acquisition unit configured to acquire first information indicating positions and attitudes of a plurality of vehicles from outside of the plurality of vehicles, the plurality of vehicles being manufactured step by step while they are continuously moving; a second information acquisition unit configured to acquire second information, provided in at least one of the vehicles, the second information indicating a position and an attitude of a vehicle in front of or behind the vehicle; and an abnormality occurrence detection unit configured to switch control of the plurality of vehicles or notify someone or something outside the plurality of vehicles when a difference between the positions and attitudes of the plurality of vehicles acquired from the first information and the positions and attitudes of the plurality of vehicles acquired from the second information is larger than a predetermined value.

7 Claims, 8 Drawing Sheets

RELATIVE POSITION
RELATIVE ATTITUDE

(52) U.S. Cl.
CPC ... *G05B 19/4183* (2013.01); *G05B 19/41865* (2013.01); *G05B 19/4189* (2013.01)

(56) References Cited

U.S. PATENT DOCUMENTS

| | | | |
|---|---|---|---|
| 2021/0286356 A1 | 9/2021 | Yang et al. | |
| 2024/0231327 A1* | 7/2024 | Knap | ................... B23P 21/004 |

* cited by examiner

Fig. 5

VEHICLE MANUFACTURING SYSTEM, VEHICLE MANUFACTURING METHOD, AND NON-TRANSITORY COMPUTER READABLE MEDIUM

CROSS REFERENCE TO RELATED APPLICATIONS

This application is based upon and claims the benefit of priority from Japanese patent application No. 2024-024429, filed on Feb. 21, 2024, the disclosure of which is incorporated herein in its entirety by reference.

BACKGROUND

The present disclosure relates to a vehicle manufacturing system, a vehicle manufacturing method, and a program.

Patent Literature 1 discloses that vehicles travel autonomously or under remote control in a manufacturing system for manufacturing vehicles.

Patent Literature 1: Published Japanese Translation of PCT International Publication for Patent Application, No. 2017-538619

SUMMARY

However, Patent Literature 1 discloses merely that vehicles are remotely controlled by using information obtained outside the vehicles. Therefore, an object of the present disclosure is to provide a vehicle manufacturing system for detecting the occurrence of an abnormality when a difference between first information acquired from the outside of a vehicle and second information acquired from the inside of the vehicle is larger than a predetermined value.

A vehicle manufacturing system according to the present disclosure includes:

first information acquisition means for acquiring first information indicating positions and attitudes of a plurality of vehicles from outside of the plurality of vehicles, the plurality of vehicles being manufactured step by step while they are continuously moving;

second information acquisition means for acquiring second information, provided in at least one of the vehicles, the second information indicating a position and an attitude of a vehicle in front of or behind the vehicle in which the second information acquisition means is provided; and abnormality occurrence detection means for switching control of the plurality of vehicles or notifying someone or something outside the plurality of vehicles when a difference between the positions and attitudes of the plurality of vehicles acquired from the first information and the positions and attitudes of the plurality of vehicles acquired from the second information is larger than a predetermined value.

By the above-described configuration, it is possible to provide a system for detecting the occurrence of an abnormality when a difference between first information acquired from the outside of a vehicle and second information acquired from the inside of the vehicle is larger than a predetermined value.

In the vehicle manufacturing system according to the present disclosure, the first information is an image or a distance, the second information is an image or a distance, the first information acquisition means is a photographing apparatus, a LiDAR, a radar, a GPS, or an ultrasonic sensor, and the second information acquisition means is a photographing apparatus, a LiDAR, a radar, a GPS, or an ultrasonic sensor.

The above-described configuration is an example of the first information, the second information, the first information acquisition means, and the second information acquisition means.

In the vehicle manufacturing system according to the present disclosure, the switching of control of the plurality of vehicles is to stop or decelerate the plurality of vehicles.

The above-described configuration is an example of the switching of control of vehicles.

In the vehicle manufacturing system according to the present disclosure, the notification to the outside is to notify a manager, an operator, or a production management system of an abnormality.

The above-described configuration is an example of the notification to the outside.

In the vehicle manufacturing system according to the present disclosure, the predetermined value is changed according to a specific section.

By the above-described configuration, a threshold for the difference, which is the predetermined value, can be changed according to the specific section.

In the vehicle manufacturing system according to the present disclosure, the specific section is a section in which a vehicle makes a U-turn, a section having a large turning curvature, or a slope.

The above-described configuration is an example of the specific section.

A method for manufacturing vehicles according to the present disclosure includes:

acquiring first information indicating positions and attitudes of a plurality of vehicles by using first information acquisition means provided outside the plurality of vehicles, the plurality of vehicles being manufactured step by step while they are continuously moving;

acquiring, by using second information acquisition means provided in at least one of the vehicles, second information indicating a position and an attitude of a vehicle in front of or behind the vehicle in which the second information acquisition means is provided; and switching control of the plurality of vehicles or notifying someone or something outside the plurality of vehicles when a difference between the positions and attitudes of the plurality of vehicles acquired from the first information acquisition means and the positions and attitudes of the plurality of vehicles acquired from the second information acquisition means is larger than a predetermined value.

By the above-described configuration, it is possible to provide a method for detecting the occurrence of an abnormality when a difference between first information acquired from the outside of a vehicle and second information acquired from the inside of the vehicle is larger than a predetermined value.

A program according to the present disclosure causes an information processing apparatus to:

acquire first information indicating positions and attitudes of a plurality of vehicles by using first information acquisition means provided outside the plurality of vehicles, the plurality of vehicles being manufactured step by step while they are continuously moving;

acquire, by using second information acquisition means provided in at least one of the vehicles, second information indicating a position and an attitude of a vehicle in front of or behind the vehicle in which the second information acquisition means is provided; and switch control of the plurality of vehicles or notify the outside of the plurality of vehicles when a difference between the positions and attitudes of the plurality of vehicles acquired from the first information acquisition means and the positions and attitudes of the plurality of vehicles acquired from the second information acquisition means is larger than a predetermined value.

By the above-described configuration, it is possible to provide a program for causing an information processing apparatus to detect the occurrence of an abnormality when a difference between first information acquired from the outside of a vehicle and second information acquired from the inside of the vehicle is larger than a predetermined value.

According to the present disclosure, it is possible to provide a vehicle manufacturing system and the like capable of detecting the occurrence of an abnormality when a difference between first information acquired from the outside of a vehicle and second information acquired from the inside of the vehicle is larger than a predetermined value.

The above and other objects, features, and advantages of the present disclosure will become more fully understood from the detailed description given hereinbelow and the accompanying drawings.

BRIEF DESCRIPTION OF DRAWINGS

FIG. 5 is a control block diagram for explaining Travel Control Example 1;

DESCRIPTION OF EMBODIMENTS

Embodiments

Figure 1:
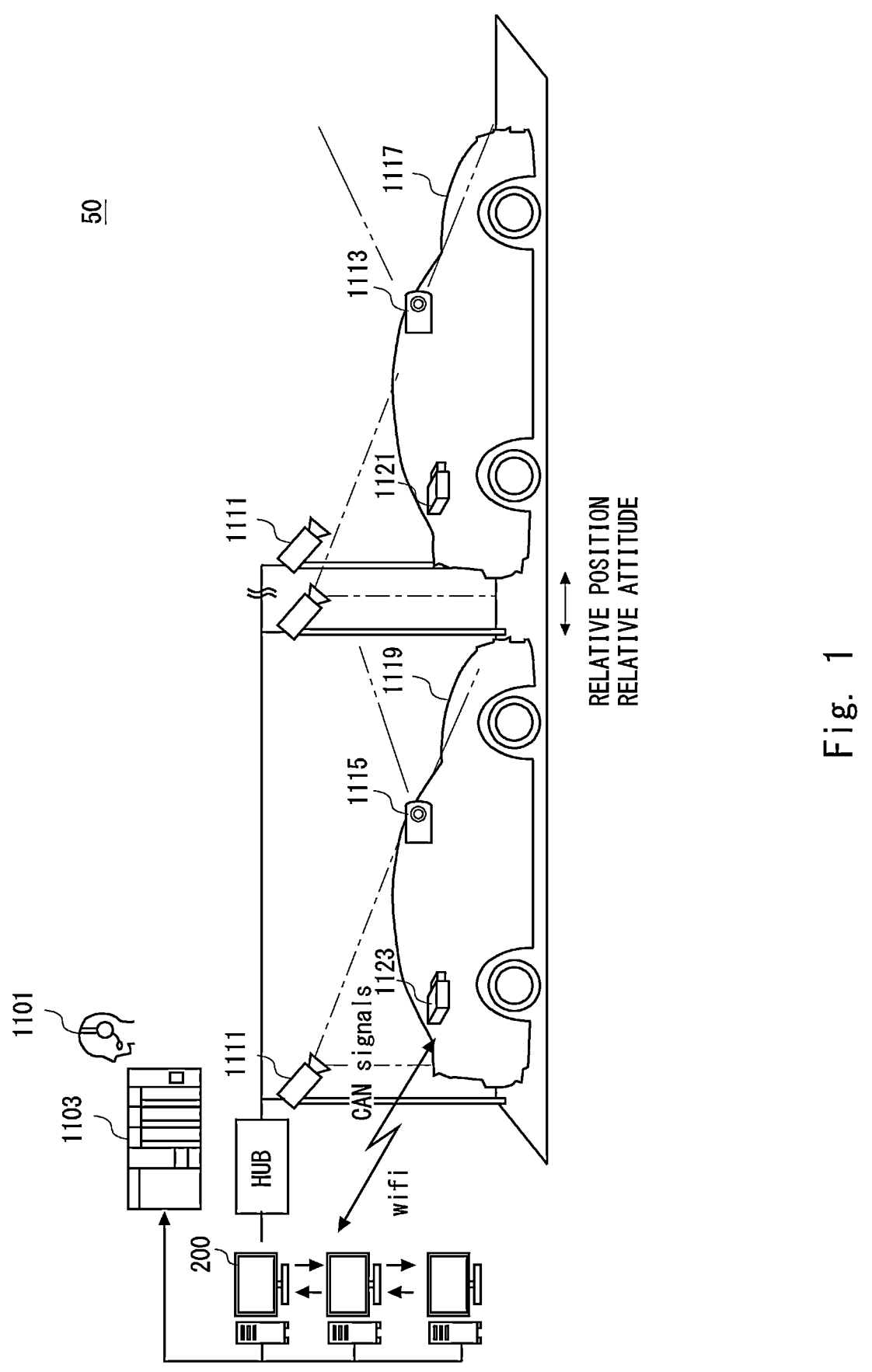
FIG. 1 is a schematic diagram showing an overview of a vehicle manufacturing system according to an embodiment.

Embodiments according to the present disclosure will be described hereinafter with reference to the drawings. However, the invention specified in the claims is not limited to the below-shown embodiments. Further, all the components/structures described in the embodiments are not necessarily indispensable as means for solving the problem. For clarifying the explanation, the following description and drawings are partially omitted and simplified as appropriate. The same reference numerals (or symbols) are assigned to the same elements throughout the drawings and redundant descriptions thereof are omitted as appropriate.

Description of Overview of Vehicle Manufacturing System According to Embodiment FIG. 1 is a schematic diagram showing an overview of a vehicle manufacturing system according to an embodiment.

An overview of a vehicle manufacturing system 50 according to an embodiment will be described with reference to FIG. 1. The vehicle manufacturing system 50 is used in a vehicle manufacturing factory.

As shown in FIG. 1, the vehicle manufacturing system 50 includes a server 200, a first information acquisition unit 1111, second information acquisition units 1113 and 1115, a first vehicle 1117, a second vehicle 1119, and radio communication terminals 1121 and 1123. A manager 1101 and a production management system 1103 are present outside the vehicle manufacturing system.

The manager 1101 is a person who works in the factory. For example, the manager 1101 is a manager or an operator for the production management system 1103 or a process performed therein. The manager 1101 manages the vehicle manufacturing system 50.

The production management system 1103 is a manufacturing execution system, and is a system for monitoring and managing equipment in the factory and work performed therein by workers by linking with each part of the production line of the factory. The production management system 1103 acquires information from BOP (Bill Of Process)/BOE (Bill Of Equipment). Further, the production management system 1103 also includes a production instruction database for providing information about instructions in regard to the production to the vehicle manufacturing system. The instructions in regard to the production are instructions for people and equipment, such as instructions in regard to parts to be used or procedures to be followed, in addition to types and specifications of individual products according to a production plan.

The first and second vehicles 1117 and 1119 are a plurality of vehicles which are manufactured step by step while they are continuously moving. Hereinafter, the first and second vehicles 1117 and 1119 are also referred to as vehicles 100. The vehicle 100, i.e., each of vehicles 100, includes an ECU (Electronic Control Unit), and also includes a battery and a motor mounted on the body of the vehicle. Further, tires are attached to the vehicle, so that the vehicle can autonomously travel.

More specifically, the vehicle 100 is a battery electric vehicle (BEV: Battery Electric Vehicle). Note that the vehicle 100 is not limited to electric vehicles, and may be, for example, an electric motorcycle, an electric bicycle, an electric kickboard, a hybrid vehicle, or a fuel cell vehicle. Further, the vehicle 100 may be a vehicle equipped with wheels or endless tracks, e.g., caterpillars, and may be, for example, a passenger car, a truck, a bus, a two-wheeled vehicle, a four-wheeled vehicle, a tank, a construction vehicle, or any of other types of vehicles. Further, the vehicle 100 is not limited to vehicles, and may be an electric vertical takeoff and landing aircraft (so-called a flying car). The vehicle 100 becomes a completed vehicle step by step as parts are assembled into the vehicle 100 while it is traveling by itself.

In the vehicle 100, first information indicating its position and attitude (e.g., orientation and the like) is acquired by the first information acquisition unit 1111, so that the vehicle 100 moves while being controlled by the server 200. For the first information acquisition unit 1111, for example, a LiDAR (Light Detection And Ranging) or a photographing apparatus can be used. The photographing apparatus may be an RGB camera, an RGBD camera, an infrared camera, or the like. Further, the first information acquisition unit 1111 may be a radar, a GPS (Global Positioning System), or an ultrasonic sensor. The first information is an image or a distance. The first information acquisition unit 1111 acquires the distance and the image of the vehicle 100, and the server 200 calculates the relative position and the relative attitude of the vehicle 100. The server 200 may perform an image analysis by using AI (Artificial Intelligence) in order to acquire the position and attitude of the vehicle from the image. The position indicates a distance between the vehicle and another vehicle, and the attitude indicates the orientation or steering angle of the vehicle.

The second information acquisition unit 1113 is provided in the first vehicle 1117. The second information acquisition unit 1115 is provided in the second vehicle 1119. Each of the second information acquisition units 1113 and 1115 acquires second information indicating the position and attitude of a vehicle in front of or behind the vehicle in which the second information acquisition unit is provided. Although FIG. 1 shows that the second information acquisition unit acquires only second information in regard to the vehicle in front of the vehicle in which the second information acquisition unit is provided, it may acquire second information in regard to the vehicle behind the vehicle in which the second information acquisition unit is provided. Each of the second information acquisition units 1113 and 1115 is, for example, a radar or a photographing apparatus. The second information acquisition unit may be a LiDAR, a GPS, or an ultrasonic sensor. The second information is an image or a distance. The second information acquisition units 1113 and 1115 acquire distances to the vehicles in front of or behind the first and second vehicles 1117 and 1119, respectively, in which the second information acquisition units are provided and images thereof. Then, the server 200 calculates relative positions and relative attitudes of the vehicles in front of or behind the first and second vehicles 1117 and 1119 in which the second information acquisition units are provided. The server 200 may perform image analyses by using AI (Artificial Intelligence) in order to acquire positions and attitudes of the vehicles from the images.

The radio communication terminal 1121 is provided in the first vehicle 1117. The radio communication terminal 1123 is provided in the second vehicle 1119. The radio communication terminal 1121 transmits the second information acquired by the second information acquisition unit 1113 of the first vehicle 1117 to the server 200 through CAN (Controller Area Network) communication. Similarly, the radio communication terminal 1123 transmits the second information acquired by the second information acquisition unit 1115 of the second vehicle 1119 to the server 200 through CAN communication.

The server 200 is an information processing apparatus including a memory and a processor, and functions as a vehicle manufacturing control apparatus for controlling the vehicle manufacturing system. For example, the server 200 receives results of detections by the first information acquisition unit 1111 and the second information acquisition units 1113 and 1115. The server 200 controls the vehicles according to the detection results and the like. The server 200 may be composed of one apparatus or a plurality of apparatuses. The server 200 may be a cloud server that processes some or all of its functions in a distributed manner.

The server 200 processes, for example, signals received from the first information acquisition unit 1111. The server 200 acquires positions and attitudes of a plurality of vehicles 100 including the first and second vehicles 1117 and 1119 by using the first information acquired from the first information acquisition unit 1111.

The server 200 processes, for example, signals received from the second information acquisition units 1113 and 1115. The server 200 acquires positions and attitudes of a plurality of vehicles 100 including the first and second vehicles 1117 and 1119 by using the second information acquired from the second information acquisition units 1113 and 1115.

The server 200 switches the control of the plurality of vehicles or notifies the outside of the plurality of vehicles when a difference between the positions and attitudes of the plurality of vehicles acquired from the first information and the positions and attitudes of the plurality of vehicles acquired from the second information is larger than a predetermined value. When the difference between the first information and the second information is larger than a predetermined value, e.g., when there is an error in the measurement of the distance between vehicles, it is dangerous for the vehicle 100 to continue traveling. Therefore, the server 200 switches the control of the vehicles or notifies the outside when an abnormality occurs in the manufacturing of vehicles.

Switching the control of a plurality of vehicles is to stop or decelerate the plurality of vehicles, which are traveling in line. Further, notifying the outside is to notify the manager 1101 or the production management system 1103 of the abnormality.

The predetermined value, which is used as the threshold for the difference between the first information and the second information, may be changed according to the section. For a section in which vehicles are traveling in line in an ordinary manner, the predetermined value for the distance between vehicles is about 10 cm with the steering angle being about 3°. In contrast, for a section in which vehicles make a U-turn, a section in which the turning curvature is large, or in a slope, the predetermined value may be increased from the aforementioned distance. For example, in a specific section such as a section in which vehicles make a U-turn or a section in which the turning curvature is large, or a slope, the predetermined value for the distance between vehicles may be about 20 cm with the steering angle being about 5°. This is because in such a specific section, there is a possibility that each of the second information acquisition units 1113 and 1115 may determine, as the distance and the steering angle, values larger than the actual distance and the actual steering angle.

Figure 2:
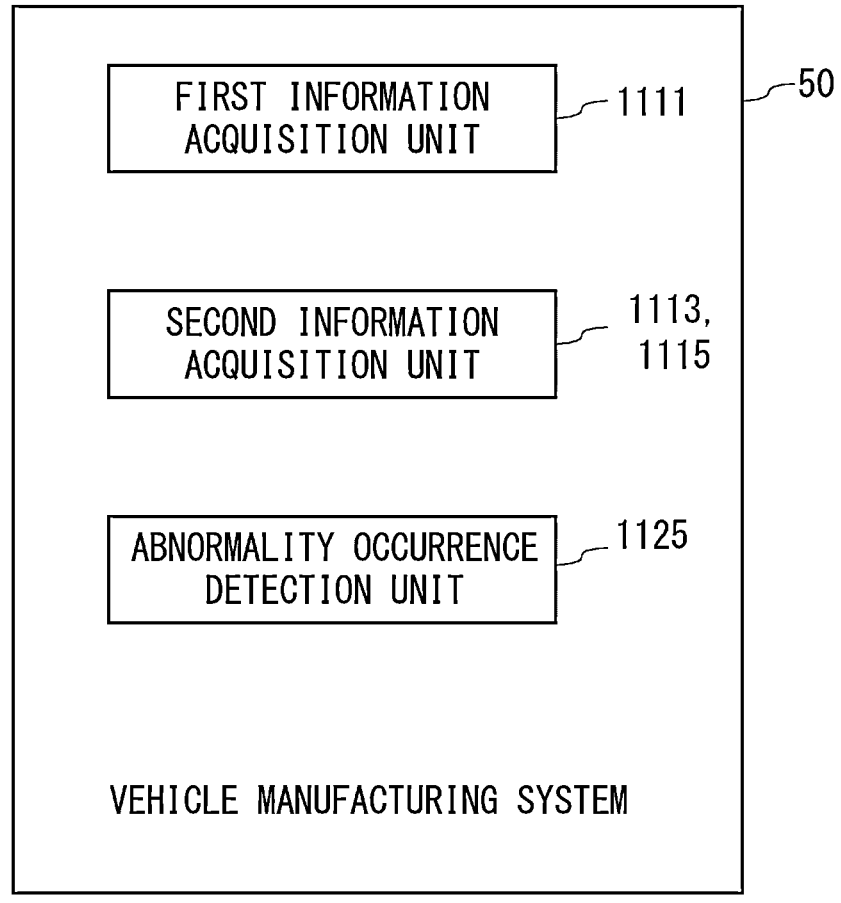
FIG. 2 is a block diagram showing a configuration of a vehicle manufacturing system according to an embodiment.

Description of Configuration of Vehicle
Manufacturing System According to Embodiment FIG. 2 is a block diagram showing a configuration of a vehicle manufacturing system according to an embodiment. The configuration of the vehicle manufacturing system according to the embodiment will be described with reference to FIG. 2.

As shown in FIG. 2, the vehicle manufacturing system 50 includes the first information acquisition unit 1111, the second information acquisition units 1113 and 1115, and an abnormality occurrence detection unit 1125. The abnormality occurrence detection unit 1125 is a part of the function of the server 200.

The first information acquisition unit 1111 acquires first information indicating the positions and attitudes of a plurality of vehicles, which are manufactured step by step while they are continuously moving, from the outside of the plurality of the vehicles. The first information acquisition unit 1111 is preferably, for example, an infrared camera or a LiDAR. The first information acquisition unit 1111 acquires distances between a plurality of vehicles and steering-angle directions thereof.

At least one of the second information acquisition units 1113 and 1115 is provided in at least one vehicle, and acquires second information indicating the position and attitude of a vehicle in front of or behind the vehicle in which the second information acquisition unit is provided. Each of the second information acquisition units 1113 and 1115 can acquire a distance to the vehicle in front of or behind the vehicle in which the second information acquisition unit is provided and a steering-angle direction thereof.

The abnormality occurrence detection unit 1125 switches the control of the plurality of vehicles or notifying someone or something outside the plurality of vehicles when a difference between the positions and attitudes of the plurality of vehicles acquired from the first information and the positions and attitudes of the plurality of vehicles acquired from the second information is larger than a predetermined value.

The first information acquisition unit 1111, the second information acquisition units 1113 and 1115, and the abnormality occurrence detection unit 1125 may also be referred to as first information acquisition means, second information acquisition means, and abnormality occurrence detection means, respectively.

By the above-described configuration, it is possible to provide a vehicle manufacturing system capable of detecting the occurrence of an abnormality when a difference between first information acquired from the outside of a vehicle and second information acquired from the inside of the vehicle is larger than a predetermined value.

Description of Vehicle Manufacturing Method According to Embodiment

Figure 3:
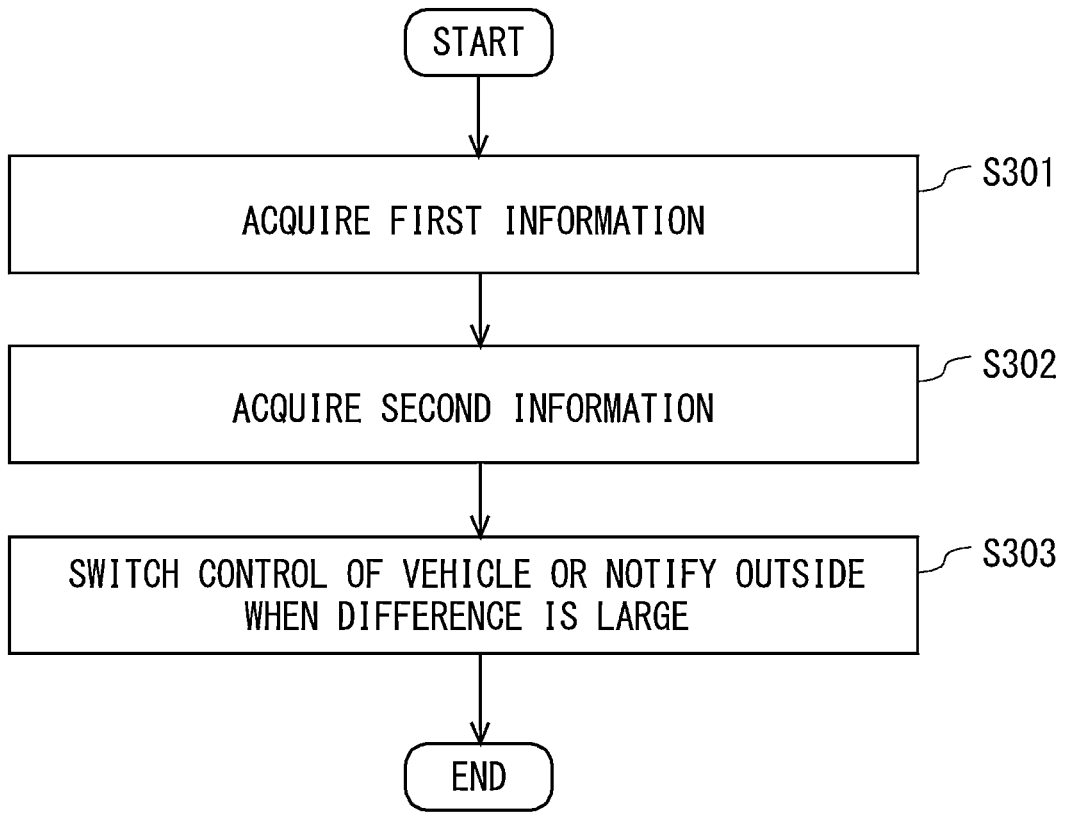
FIG. 3 is a flowchart of a vehicle manufacturing method according to an embodiment.

FIG. 3 is a flowchart of a vehicle manufacturing method according to an embodiment. The vehicle manufacturing method according to the embodiment will be described with reference to FIG. 3.

As shown in FIG. 3, the first information acquisition unit 1111 acquires first information (Step S301). The first information acquisition unit 1111 acquires first information indicating the positions and attitudes of a plurality of vehicles, which are manufactured step by step while they are continuously moving, from the outside of the plurality of vehicles.

Next, the second information acquisition units 1113 and 1115 acquire second information (Step S302). At least one of the second information acquisition units 1113 and 1115 is provided in at least one vehicle, and acquires second information indicating the position and attitude of a vehicle in front of or behind the vehicle in which the second information acquisition unit is provided.

Next, the abnormality occurrence detection unit 1125 switches the control of the vehicles or notifies the outside when the difference is large (Step S303). The abnormality occurrence detection unit 1125 switches the control of the plurality of vehicles or notifying someone or something outside the plurality of vehicles when a difference between the positions and attitudes of the plurality of vehicles acquired from the first information and the positions and attitudes of the plurality of vehicles acquired from the second information is larger than a predetermined value.

By the above-described configuration, it is possible to provide a method for manufacturing vehicles in which the occurrence of an abnormality is detected when a difference between first information acquired from the outside of a vehicle and second information acquired from the inside of the vehicle is larger than a predetermined value.

A. Traveling Control Example 1

Figure 4:
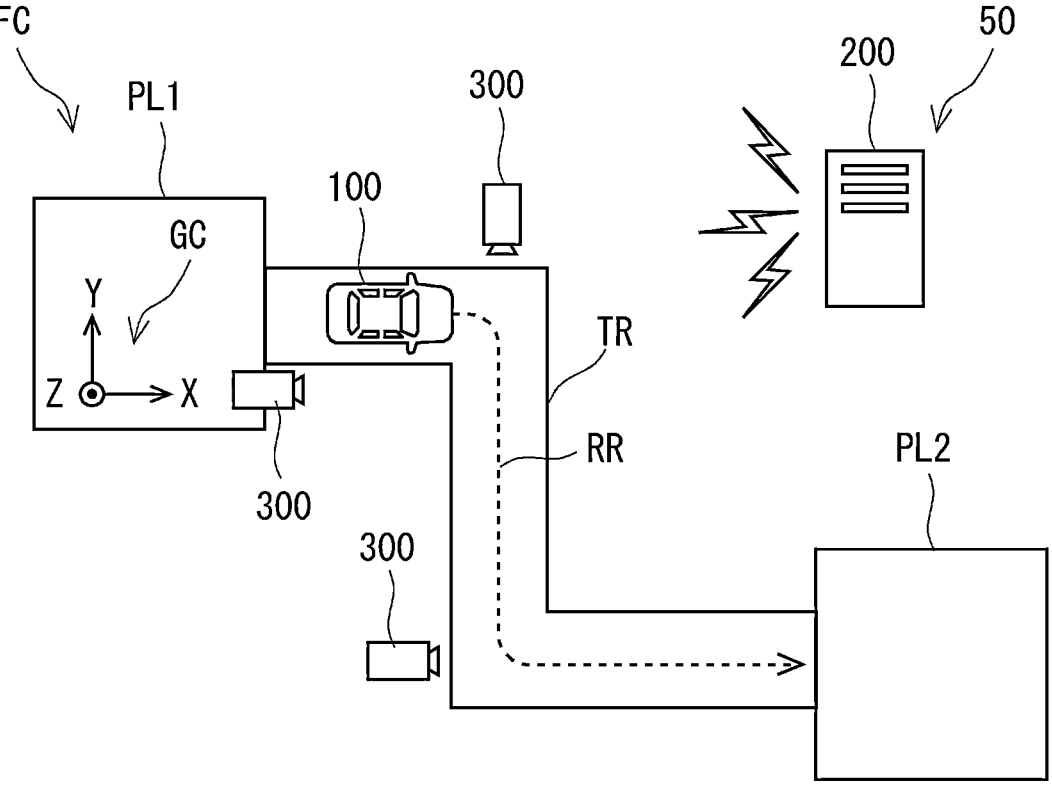
FIG. 4 is a diagram for explaining control of the traveling of a vehicle.

FIG. 4 is a conceptual diagram showing a configuration of a system 50 in Traveling Control Example 1. The system 50 includes at least one vehicle 100 as a mobile object, a server 200, and at least one external sensor 300.

Note that when the mobile object is an object other than the vehicle, each of the terms "vehicle" and "car" in the present disclosure can be replaced with a "mobile object" as appropriate, and the term "traveling" can be replaced with a "movement" as appropriate.

The vehicle 100 is configured to be able to travel by an unattended operation. The "unattended operation" means an operation (e.g., driving) that does not rely on a traveling operation performed by an occupant (e.g., a driver). The traveling operation means an operation related to at least one of "running", "turning", and "stopping" of the vehicle 100. The unattended operation is carried out by automatic or manual remote control using an apparatus located outside the vehicle 100, or by autonomous control of the vehicle 100. An occupant (e.g., a driver or a passenger) who does not perform a traveling operation may be on board the vehicle 100 which is traveling by an unattended operation. Examples of occupants who do not perform a traveling operation includes a person simply sitting on a seat of the vehicle 100 and a person who performs an operation other than the traveling operation, such as assembling, inspecting, and operating switches while being on board the vehicle 100. Note that the operation (e.g., driving) by a traveling operation performed by an occupant may be referred to as a "manned operation (or piloted operation)".

In this specification, the "remote control" includes "full remote control" in which all the operations of the vehicle 100 are completely determined from the outside of the vehicle 100, and "partial remote control" in which some of the operations of the vehicle 100 are determined from the outside of the vehicle 100. Further, the "autonomous control" includes "full autonomous control" in which the vehicle 100 autonomously controls its own operations without receiving any information from an apparatus located outside the vehicle 100, and "partial autonomous control" in which the vehicle 100 autonomously controls its own operations by using information received from an apparatus located outside the vehicle 100.

In this embodiment, the system 50 is used in a factory FC in which vehicles 100 are manufactured. The reference coordinate system of the factory FC is a global coordinate system GC. That is, any position in the factory FC is represented by X, Y and Z-coordinates in the global coordinate system GC. The factory FC includes a first place PL1 and a second place PL2. The first and second places PL1 and PL2 are connected to each other by a track TR (e.g., passageway) on which a vehicle 100 can travel. The factory FC includes a plurality of external sensors 300 along the track TR. The positions of the external sensors 300 in the factory FC are adjusted in advance. The vehicle 100 moves from the first place PL1 to the second place PL2 through the track TR by an unattended operation.

Figure 5:
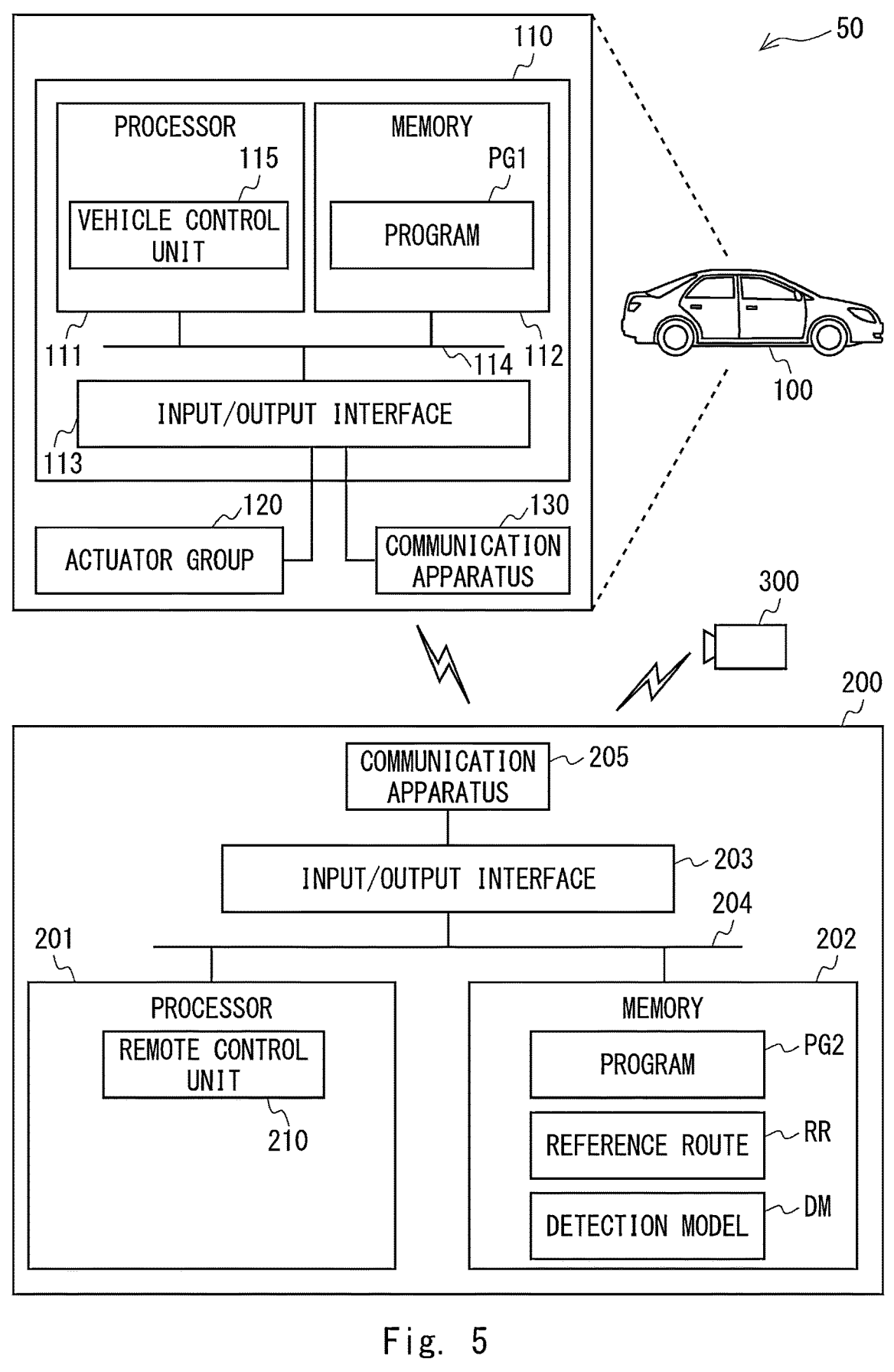

FIG. 5 is a block diagram showing a configuration of the system 50. The vehicle 100 includes a vehicle control apparatus 110 for controlling various units of the vehicle 100, an actuator group 120 including at least one actuator driven under the control of the vehicle control apparatus 110, and a communication apparatus 130 for communicating with an external apparatus such as the server 200 through wireless communication. The actuator group 120 includes an actuator of a driving unit for accelerating the vehicle 100, an actuator of a steering unit for changing the traveling direction of the vehicle 100, and an actuator of a braking unit for decelerating the vehicle 100.

The vehicle control apparatus 110 is composed of a computer including a processor 111, a memory 112, an input/output interface 113, and an internal bus 114. The processor 111, the memory 112, and the input/output interface 113 are connected to each other through the internal bus 114 so that they can bidirectionally communicate with each other. The actuator group 120 and the communication apparatus 130 are connected to the input/output interface 113. The processor 111 implements various functions including the function as the vehicle control unit 115 by executing a program PG1 stored in the memory 112.

The vehicle control unit 115 drives the vehicle 100 by controlling the actuator group 120. The vehicle control unit 115 can drive the vehicle 100 by controlling the actuator group 120 by using a driving control signal received from the server 200. The driving control signal is a control signal for driving the vehicle 100. In this embodiment, the driving control signal includes an acceleration and a steering angle of the vehicle 100 as parameters. In other embodiments, the driving control signal may include a speed of the vehicle 100 as a parameter instead of or in addition to the acceleration of the vehicle 100.

The server 200 is composed of a computer including a processor 201, a memory 202, an input/output interface 203, and an internal bus 204. The processor 201, the memory 202, and the input/output interface 203 are connected through the internal bus 204 so that they can bidirectionally communicate with each other. A communication apparatus 205 for communicating with various apparatuses located outside the server 200 is connected to the input/output interface 203. The communication apparatus 205 can communicate with the vehicle 100 through wireless communication, and can communicate with each of the external sensors 300 through wired communication or wireless communication. The processor 201 implements various functions including the function as the remote-control unit 210 by executing a program PG2 stored in the memory 202.

The remote-control unit 210 acquires a detection result obtained by a sensor, generates a driving control signal for controlling the actuator group 120 of the vehicle 100 by using the detection result, and transmits the generated driving control signal to the vehicle 100. In this way, the remote-control unit 210 drives the vehicle 100 by remote control. The remote-control unit 210 may generate and output, in addition to the driving control signal, control signals for controlling various auxiliary apparatuses provided in the vehicle 100 and actuators for operating various types of equipment such as wipers, power windows, and lamps. That is, the remote-control unit 210 may operate these various types of equipment and various auxiliary apparatuses by remote control.

The external sensor 300 is a sensor located outside the vehicle 100. The external sensor 300 in this embodiment is a sensor for capturing (e.g., finding and keeping track of) the vehicle 100 from outside the vehicle 100. The external sensor 300 includes a communication apparatus (not shown) and can communicate with other apparatuses such as the server 200 through wired communication or wireless communication.

Specifically, the external sensor 300 is formed by a camera (e.g., a still camera or a video camera). A camera, which functions as the external sensor 300, takes an image (e.g., a still image or a moving image) including (i.e., showing therein) the vehicle 100 and outputs the taken image as a detection result.

Figure 6:
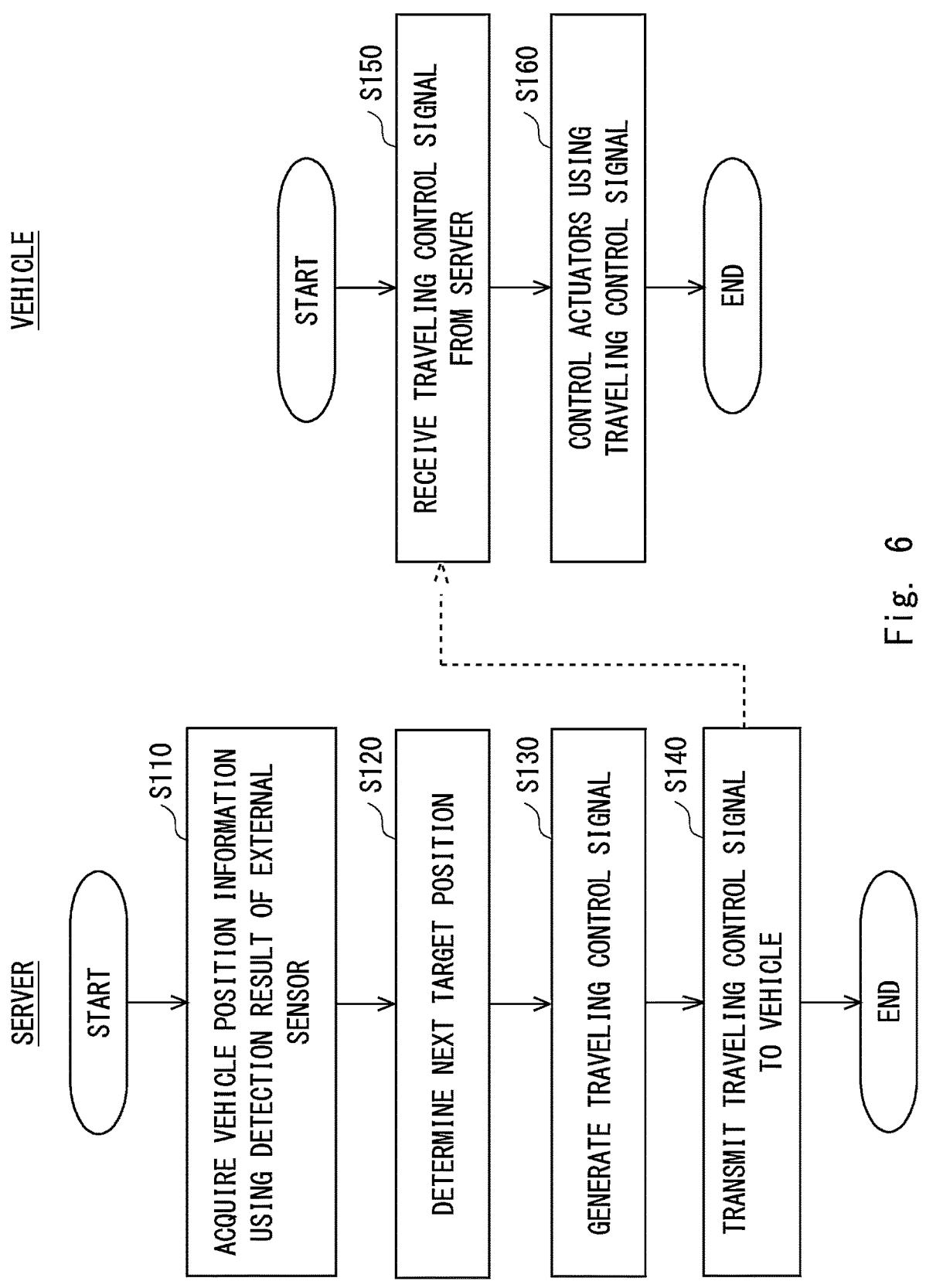
FIG. 6 is a flowchart for explaining Travel Control Example 1.

FIG. 6 shows a flowchart showing a procedure of processes for controlling the traveling of a vehicle 100 in a traveling control example. In the procedure of processes shown in FIG. 6, the processor 201 of the server 200 functions as the remote-control unit 210 by executing the program PG2. Further, the processor 111 of the vehicle 100 functions as the vehicle control unit 115 by executing the program PG1.

In a step S110, the processor 201 of the server 200 acquires vehicle position information of the vehicle 100 by using a detection result output from the external sensor 300. The vehicle position information is position information based on which a driving control signal is generated. In this embodiment, the vehicle position information includes the position and orientation of the vehicle 100 in the global coordinate system GC of the factory FC. Specifically, in a step S110, the processor 201 acquires vehicle position information by using the photographed image acquired from the camera serving as the external sensor 300.

Specifically, in the step S110, the processor 201 acquires the position of the vehicle 100 by, for example, detecting the external shape of the vehicle 100 from the photographed image, calculating the coordinates of the positioning point of the vehicle 100 in the coordinate system of the photographed image, i.e., in the local coordinate system, and converting the calculated coordinates into coordinates in the global coordinate system GC. The external shape of the vehicle 100 included (i.e., shown) in the photographed image can be detected by, for example, inputting the photographed image into a detection model DM using artificial intelligence. The detection model DM is prepared, for example, in the system 50 or outside the system 50, and stored in the memory 202 of the server 200 in advance. Examples of the detection model DM include a trained machine-learning model that has been trained to perform either semantic segmentation or instance segmentation. As this machine-learning model, for example, a convolutional neural network (hereinafter also referred to as a CNN) trained through supervised learning using a learning data set can be used. The learning data set includes, for example, a plurality of training images each including the vehicle 100 and labels each indicating whether a respective area in the training image is an area indicating the vehicle 100 or an area that does not indicate a mobile object. When the CNN is trained, it is preferred that parameters of the CNN are updated by backpropagation (error backpropagation method) so that errors between output results by the detection model DM and labels are reduced. Further, the processor 201 can acquire the orientation of the vehicle 100 by, for example, estimating it based on the orientation of the moving vector of the vehicle 100 calculated from changes in the positions of the feature points of the vehicle 100 between frames of the photographed images by using an optical flow method.

In a step S120, the processor 201 of the server 200 determines a target position to which the vehicle 100 should go next. In this embodiment, the target position is represented by X, Y and Z-coordinates in the global coordinate system GC. In the memory 202 of the server 200, a reference route RR, which is a route along which the vehicle 100 should travel, is stored in advance. A route is represented by a node indicating a starting point, a node(s) indicating a passing point(s), a node indicating a destination, and links connecting these nodes with one another. The processor 201 determines a target position to which the vehicle 100 should go next by using the vehicle position information and the reference route RR. The processor 201 determines the target position of the vehicle 100 ahead of the current position thereof on the reference route RR.

In a step S130, the processor 201 of the server 200 generates a driving control signal for driving the vehicle 100 toward the determined target position. The processor 201 calculates the traveling speed of the vehicle 100 based on the changes in the position of the vehicle 100, and compares the calculated traveling speed with the target speed. When the traveling speed is lower than the target speed, the processor 201 determines, as a whole, the acceleration of the vehicle 100 so that the vehicle 100 accelerates, whereas when the traveling speed is higher than the target speed, the processor 201 determines the acceleration so that the vehicle 100 decelerates. Further, when the vehicle 100 is positioned on the reference route RR, the processor 201 determines the steering angle and the acceleration of the vehicle 100 so that the vehicle 100 does not deviate from the reference route RR, whereas when the vehicle 100 is not positioned on the reference route RR, i.e., the vehicle 100 has deviated from the reference route RR, the processor 201 determines the steering angle and the acceleration so that the vehicle 100 returns to the reference route RR.

In a step S140, the processor 201 of the server 200 transmits the generated driving control signal to the vehicle 100. The processor 201 repeats the acquisition of the position of the vehicle 100, the determination of a target position, the generation of a driving control signal, the transmission of the driving control signal, and the like in a predetermined cycle.

In a step S150, the processor 111 of the vehicle 100 receives the driving control signal transmitted from the server 200. In a step S160, the processor 111 of the vehicle 100 controls the actuator group 120 by using the received driving control signal, and thereby drives the vehicle 100 so as to travel at the acceleration and the steering angle indicated by the driving control signal. The processor 111 repeats the reception of a driving control signal and the control of the actuator group 120 at a predetermined cycle. According to the system 50 in this example, it is possible to drive the vehicle 100 by remote control, and thereby move the vehicle 100 without using conveyance equipment such as a crane or a conveyor.

B: Traveling Control Example 2

Figure 7:
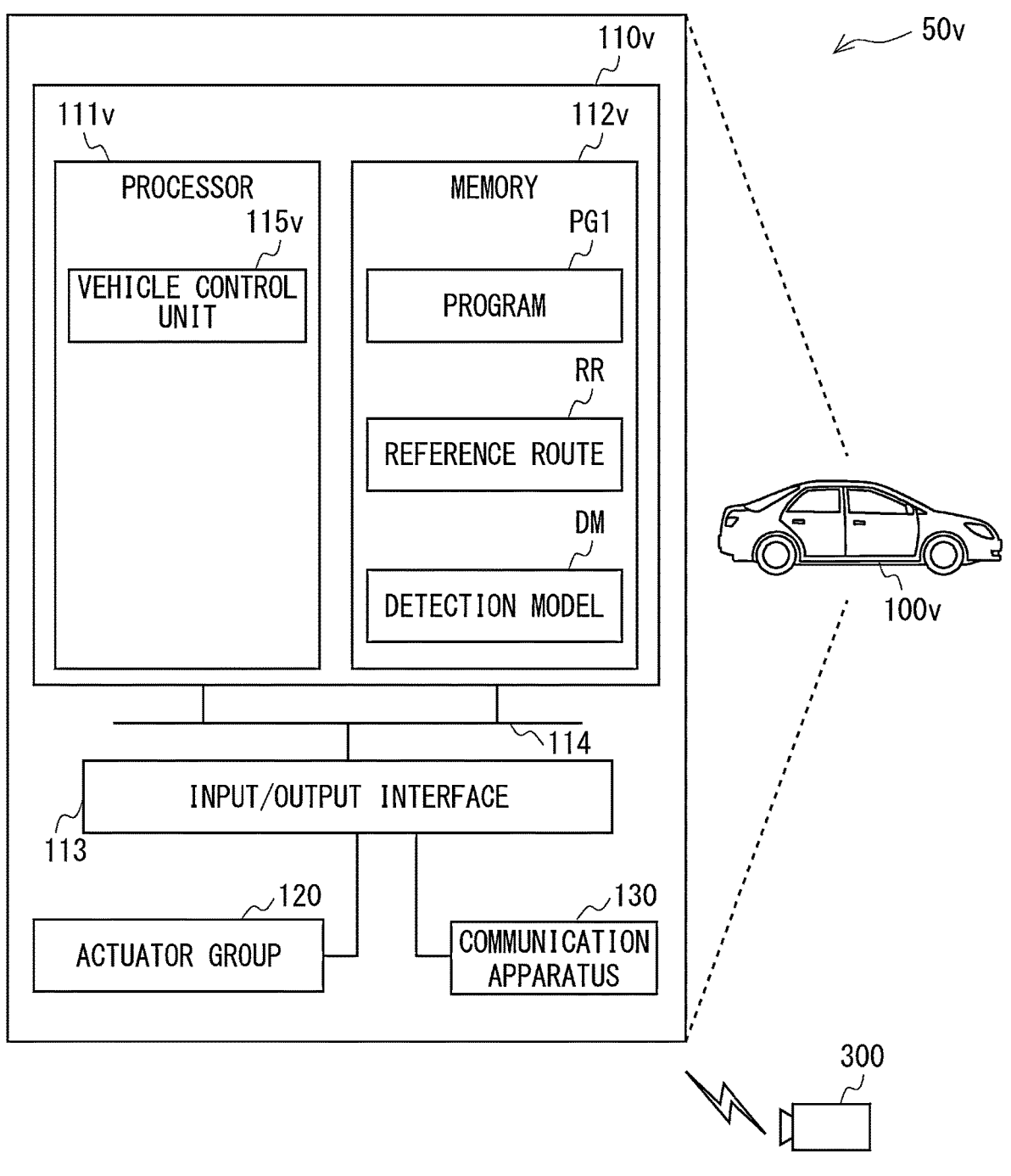
FIG. 7 is a control block diagram for explaining Travel Control Example 2.

FIG. 7 is an explanatory diagram showing a schematic configuration of a system 50*v* in Traveling Control Example 2. This example differs from Traveling Control Example 1 because the system 50*v* does not includes the server 200. Further, a vehicle 100*v* in the configuration can travel by autonomous control performed by the vehicle 100*v* itself. The rest of the configuration is the same as that described above unless otherwise specified.

In this example, a processor 111*v* of a vehicle control apparatus 110*v* functions as a vehicle control unit 115*v* by executing a program PG1 stored in a memory 112*v*. The vehicle control unit 115*v* acquires an output result obtained by a sensor, generates a driving control signal by using the output result, and outputs the generated driving control signal and thereby operates the actuator group 120. By doing so, the vehicle control unit 115*v* can make the vehicle 100*v* travel by autonomous control performed by the vehicle 100 itself. In this example, in addition to the program PG1, a detection model DM and a reference route RR are stored in the memory 112*v* in advance.

Figure 8:
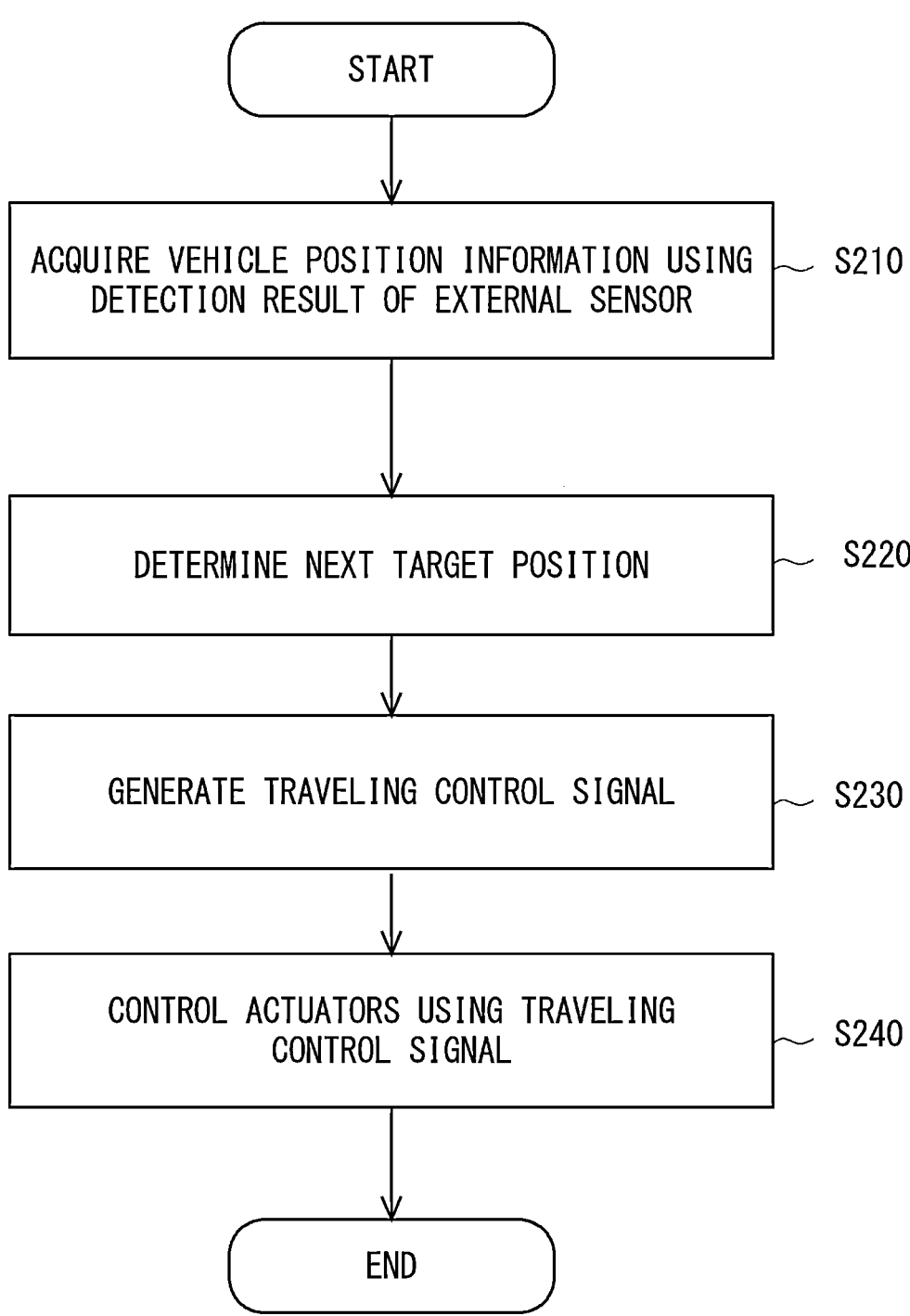
FIG. 8 is a flowchart for explaining Travel Control Example 2.

FIG. 8 shows a flowchart showing a procedure of processes for controlling the traveling of the vehicle 100*v* in Traveling Control Example 2. In the processing procedure shown in FIG. 8, the processor 111*v* of the vehicle 100*v* functions as the vehicle control unit 115*v* by executing the program PG1.

In a step S210, the processor lily of the vehicle control apparatus 110*v* acquires vehicle position information by using a detection result output from a camera which is an external sensor 300. In a step S220, the processor lily determines a target position to which the vehicle 100*v* should go next. In a step S230, the processor 111*v* generates a driving control signal for making the vehicle 100*v* travel toward the determined target position. In a step S240, the processor 111*v* controls the actuator group 120 by using the generated driving control signal, and thereby makes the vehicle 100*v* travel according to parameters indicated by the driving control signal. The processor 111*v* repeats the acquisition of vehicle position information, the determination of a target position, the generation of a driving control signal, and the control of actuators in a predetermined cycle. According to the system 50*v* in this example, it is possible to make the vehicle 100*v* travel by autonomous control performed by the vehicle 100*v* itself without having the server 200 remotely control the vehicle 100*v*.

YY: Other Traveling Control Examples (YY1) In the above-described examples, the external sensor 300 is a camera. However, the external sensor 300 may not be a camera and may be, for example, LiDAR (Light Detection And Ranging). In this case, the detection result output from the external sensor 300 may be 3D (three-dimensional) point cloud data representing the vehicle 100. In this case, the server 200 and the vehicle 100 may acquire vehicle position information by template matching between the 3D point cloud data, which is the detection result, and reference point cloud data prepared in advance.

(YY2) In Traveling Control Example 1, a series of processes from the acquisition of vehicle position information to the generation of a driving control signal are performed by the server 200. However, at least some of the processes from the acquisition of vehicle position information to the generation of a driving control signal may be performed by the vehicle 100. For example, the below-shown Embodiments (1) to (3) may be adopted.

(1) The server 200 may acquire vehicle position information, determine a target position to which the vehicle 100 should go next, and generate a route from the current position of the vehicle 100 indicated by the acquired vehicle position information to the target position. The server 200 may generate a route to a target position which is located between the current position and the destination, or generate a route to the destination. The server 200 may transmit the generated route to the vehicle 100. The vehicle 100 may generate a driving control signal so as to travel along the route received from the server 200, and control the actuator group 120 by using the generated driving control signal.

(2) The server 200 may acquire vehicle position information and transmit the acquired vehicle position information to the vehicle 100. The vehicle 100 may determine a target position to which the vehicle 100 should go next, generate a route from the current position of the vehicle 100 indicated by the received vehicle position information to the target position, generate a driving control signal so as to travel along the generated route, and control the actuator group 120 by using the generated driving control signal.

(3) In the above-described Embodiments (1) and (2), the vehicle 100 may be equipped with an internal sensor, and a detection result output from the internal sensor may be used for at least either the generation of a route or the generation of a driving control signal. The internal sensor is a sensor provided in the vehicle 100. Examples of internal sensors may include a sensor for detecting the motion state of the vehicle 100, a sensor for detecting the operation state of each unit of the vehicle 100, and a sensor for detecting the environment around the vehicle 100. Specifically, examples of internal sensors include a camera, LiDAR, a millimeter-wave radar, an ultrasonic sensor, a GPS sensor, an acceleration sensor, and a gyro sensor. For example, in the above-described Embodiment (1), the server 200 may acquire a detection result obtained by the internal sensor, and when generating a route, take the detection result of the internal sensor into consideration in the generation of the route. In the above-described Embodiment (1), the vehicle 100 may acquire a detection result obtained by the internal sensor, and when generating a driving control signal, take the detection result of the internal sensor into consideration in the generation of the driving control signal. In the above-described Embodiment (2), the vehicle 100 may acquire a detection result obtained by the internal sensor, and when generating a route, take the detection result of the internal sensor into consideration in the generation of the route. In the above-described Embodiment (2), the vehicle 100 may acquire a detection result obtained by the internal sensor, and when generating a driving control signal, take the detection result of the internal sensor into consideration in the generation of the driving control signal.

(YY3) In Traveling Control Example 2, the vehicle 100v may be equipped with an internal sensor, and a detection result output from the internal sensor may be used for at least either the generation of a route or the generation of a driving control signal. For example, the vehicle 100v may acquire a detection result obtained by the internal sensor, and when generating a route, take the detection result of the internal sensor into consideration in the generation of the route. The vehicle 100v may acquire a detection result obtained by the internal sensor, and when generating a driving control signal, take the detection result of the internal sensor into consideration in the generation of the driving control signal.

(YY4) In Traveling Control Example 2, the vehicle 100v acquires vehicle position information by using a detection result obtained by an external sensor 300. However, the vehicle 100v may be equipped with an internal sensor, and the vehicle 100v may acquire vehicle position information by using the detection result of the internal sensor, determine a target position to which the vehicle 100v should go next, generate a route from the current position of the vehicle 100v indicated by the acquired vehicle position information to the target position, generate a driving control signal for traveling along the generated route, and control the actuator group 120 by using the generated driving control signal. In this case, the vehicle 100v can travel without using the detection result of the external sensor 300 at all. Note that the vehicle 100v may acquire a target arrival time and traffic congestion information from outside the vehicle 100v and take the target arrival time and traffic congestion information into consideration in at least either the generation of a route or the generation of a driving control signal. Further, all the functions of the system 50v may be provided in the vehicle 100v. That is, the whole processing implemented by the system 50v according to the present disclosure may be implemented by the vehicle 100v alone.

(YY5) In Traveling Control Example 1, the server 200 automatically generates a driving control signal to be transmitted to the vehicle 100. However, the server 200 may generate a driving control signal to be transmitted to the vehicle 100 according to an operation performed by an operator who is present outside the vehicle 100. For example, an operator present outside the vehicle 100 may operate a controlling apparatus including a display for displaying a photographed image output from an external sensor 300, a steering wheel, an accelerator pedal, and a brake pedal for remotely controlling the vehicle 100, and a communication apparatus for communicating with the server 200 through wired communication or wireless communication. Then, the server 200 may generate a driving control signal according to operations performed on the controlling apparatus.

(YY6) In each of the above-described traveling control examples, it is sufficient if the vehicle 100 has a configuration capable of moving the vehicle 100 by an unattended operation. For example, the vehicle 100 may be in the form of a platform including the below-described configuration. Specifically, it is sufficient if the vehicle 100 include at least a vehicle control apparatus 110 and an actuator group 120 in order to perform three functions of "running", "turning", and "stopping" by an unattended operation. In the case where the vehicle 100 acquires information from the outside the vehicle 100 in order to perform an unattended operation, it is sufficient if the vehicle 100 further include a communication apparatus 130. That is, the vehicle 100 capable of moving by an unattended operation may not include at least some of interior components such as a driver's seat and a dashboard, may not include at least some of exterior components such as a bumper and a fender, and may not include a body shell. In this case, the remaining components such as a body shell may be attached to the vehicle 100 until the vehicle 100 is shipped from the factory FC. Alternatively, the vehicle 100 may be shipped from the factory FC without the remaining components such as a body shell, and then these remaining components such as a body shell may be attached to the vehicle 100 after the shipment. These components may be attached from arbitrary directions such as from above, from below, from front, from rear, from the right side, or from the left side of the vehicle 100. Further, they may be attached from the same direction or from different directions. Note that in the case of being formed as a platform, its position may be determined in the same manner as the position of the vehicle 100 is determined in the first embodiment.

(YY7) The vehicle 100 may be manufactured by combining a plurality of modules with each other. The module means a unit composed of a plurality of components that are assembled according to the place in the vehicle 100 at which the module is used and/or according to the function in the vehicle 100. For example, the platform of the vehicle 100 may be manufactured by combining a front module constituting the front part of the platform, a center module constituting the central part of the platform, and a rear module constituting the rear part of the platform with each other. Note that the number of modules constituting the platform is not limited to three, but may be two or less, or four or more. Further, in addition to or instead of the components constituting the platform, components constituting a part of the vehicle 100 other than the platform may be assembled into a module. Further, they include various modules including optional exterior components such as a bumper and a grill, and optional interior components such as a seat and a console. Further, what is manufactured is not limited to the vehicle 100. That is, any type of mobile object may be manufactured by combining a plurality of modules with each other. Such modules may be manufactured, for example, by joining a plurality of components by welding or by using fixtures, or may be manufactured by integrally molding at least some of the components constituting the module into one component by casting. A molding method for integrally molding one component, particularly a relatively large component, may also be called giga-casting or mega-casting. For example, the aforementioned front module, the center module, and the rear module may be manufactured by giga-casting.

(YY8) The conveyance of a vehicle 100 that is carried out by making the vehicle 100 travel by an unattended operation is also called "self-propelled conveyance". Further, the configuration for carrying out self-propelled conveyance is also called a "vehicle remote control autonomous traveling conveyance system". Further, the production method for producing vehicles 100 by using self-propelled conveyance is also called "self-propelled production". In the self-propelled production, for example, at least some of the conveyance of vehicles 100 is carried out by self-propelled conveyance in the factory FC in which vehicles 100 are manufactured.

(YY9) In each of the above-described traveling control examples, some or all of the functions and processes implemented by software may be implemented by hardware. Further, some or all of the functions and processes implemented by hardware may be implemented by software. As the hardware for implementing various functions in each of the above-described embodiments, various circuits such as integrated circuits and/or discrete circuits may be used.

Further, some or all of the processes performed in the above-described external sensor 300, the vehicle 100, the server 200, and the like can be implemented in the form of a computer program. Such a program can be stored and provided to the computer by using any type of non-transitory computer readable media. Non-temporary computer readable media include various types of substantial recording media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, a CD-R/W, and a semiconductor memory (such as a mask ROM, a PROM (Programmable ROM), an EPROM (Erasable PROM), a flash ROM, and a RAM (Random Access Memory)). Further, the program may be supplied to the computer by various types of temporary computer readable media. Examples of transitory computer readable media include electric signals, optical signals, and electromagnetic waves. Temporary computer readable media can provide programs to computers through wired or wireless communication channels such as wires and optical fibers.

Note that the present invention is not limited to the above-described example embodiments, and they can be modified as appropriate without departing from the scope and spirit of the invention.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

16

What is claimed is:

1. A vehicle manufacturing system in which a plurality of vehicles is manufactured step by step while they are continuously moving comprising:

a first information acquisition external sensor configured to acquire first information indicating positions and attitudes of each of the plurality of vehicles from outside of the plurality of vehicles;

a second information acquisition internal sensor, provided in at least one of the plurality of vehicles, configured to acquire second information indicating a position and an attitude of a vehicle of the plurality of the vehicles in front of or behind each respective one of the at least one of the plurality of the vehicles; and an abnormality occurrence detection unit configured to switch control of the plurality of vehicles or notify someone or something outside the plurality of vehicles when a difference between a position and attitude of a given vehicle of the plurality of vehicles acquired from the first information and a position and attitude of the given vehicle of the plurality of the vehicles acquired from the second information is larger than a predetermined value.

2. The vehicle manufacturing system according to claim 1, wherein:

the first information is an image, the second information is an image, the first information acquisition external sensor is a photographing apparatus, a LIDAR, a radar, or an ultrasonic sensor, and the second information acquisition internal sensor is a photographing apparatus, a LiDAR, a radar, or an ultrasonic sensor.

3. The vehicle manufacturing system according to claim 1, wherein the switching of control of the plurality of vehicles is to stop or decelerate the plurality of vehicles.

4. The vehicle manufacturing system according to claim 1, wherein the notification to the outside is to notify a manager, an operator, or a production management system of an abnormality.

5. A method for manufacturing vehicles in which a plurality of vehicles is manufactured step by step while the plurality of vehicles is continuously moving, comprising:

acquiring first information indicating positions and attitudes of each of the plurality of vehicles by using a first information acquisition external sensor provided outside the plurality of vehicles;

acquiring, by using a second information acquisition internal sensor provided in at least one of the plurality of the vehicles, second information indicating a position and an attitude of a vehicle of the plurality of the vehicles in front of or behind each respective one of the at least one of the plurality of the vehicles; and switching control of the plurality of vehicles or notifying someone or something outside the plurality of vehicles when a difference between a position and attitude of a given vehicle of the plurality of vehicles acquired from the first information acquisition external sensor and a position and attitude of the given vehicle of the plurality of the vehicles acquired from the second information acquisition internal sensor is larger than a predetermined value.

6. The method according to claim 5, wherein the predetermined value is changed according to a specific section.

7. The method according to claim 6, wherein the specific section is a section in which a vehicle of the plurality of the vehicles makes a U-turn, a section having a turning curvature, or a slope.

* * * * *